US012474301B2

(12) United States Patent
Medeiros Fonseca et al.

(10) Patent No.: US 12,474,301 B2
(45) Date of Patent: Nov. 18, 2025

(54) SYSTEM AND METHOD FOR INSPECTING METAL PARTS

(71) Applicant: VALLOUREC SOLUÇÕES TUBULARES DO BRASIL S.A., Belo Horizonte (BR)

(72) Inventors: Antônio Sérgio Medeiros Fonseca, Belo Horizonte (BR); Edson José Eufrásio, Belo Horizonte (BR); Lucas Kling E Silva, Petrópolis (BR); Cesar Giron Camerini, Niterói (BR); Gabriela Ribeiro Pereira, Rio de Janeiro (BR)

(73) Assignee: VALLOUREC SOLUÕES TUBULARES DO BRASIL S.A., Belo Horizonte (BR)

( * ) Notice: Subject to any disclaimer, the term of this patent is extended or adjusted under 35 U.S.C. 154(b) by 161 days.

(21) Appl. No.: 18/254,678

(22) PCT Filed: Nov. 25, 2021

(86) PCT No.: PCT/BR2021/050519
§ 371 (c)(1),
(2) Date: Jul. 28, 2023

(87) PCT Pub. No.: WO2022/109704
PCT Pub. Date: Jun. 2, 2022

(65) Prior Publication Data
US 2024/0044842 A1 Feb. 8, 2024

(30) Foreign Application Priority Data
Nov. 26, 2020 (BR) .......................... 10 2020 024201 6

(51) Int. Cl.
*G01N 27/9093* (2021.01)
*G01N 27/83* (2006.01)
*G01N 27/90* (2021.01)

(52) U.S. Cl.
CPC ......... *G01N 27/9093* (2013.01); *G01N 27/83* (2013.01); *G01N 27/9053* (2013.01)

(58) Field of Classification Search
CPC .......... G01N 27/9093; G01N 27/9053; G01N 27/904; G01N 27/90; G01N 27/83; F16L 2101/30; F17D 5/06
(Continued)

(56) References Cited

U.S. PATENT DOCUMENTS 4,272,781 A * 6/1981 Taguchi ............. G01N 27/9093
348/82
4,818,935 A 4/1989 Takahashi et al.
(Continued)

OTHER PUBLICATIONS

International Search Report and Written Opinion for International (PCT) Patent Application No. PCT/BR2021/050519, dated Apr. 18, 2022, 7 pages.
English Translation of the International Search Report for International (PCT) Patent Application No. PCT/BR2021/050519, dated Apr. 18, 2022, 2 pages.

*Primary Examiner* — Christopher P Mcandrew
(74) *Attorney, Agent, or Firm* — Sheridan Ross P.C.

(57) ABSTRACT

This invention relates to a system for inspecting metal part surfaces, wherein a plurality of geometric profile sensors is spaced and attached to a frame, and a plurality of eddy current sensors are also spaced and attached to the frame facing the metal part surface to be inspected. During the operation of the system, there is a relative longitudinal displacement and, optionally, a relative rotational displacement between the frame and the inspected metal part. The system further includes an electromagnetic signals electronic multiplexing circuit that receives and processes signals obtained in real time from the plurality of geometric profile sensors and eddy current sensors. Furthermore, there (Continued)

is an interpretation and evaluation unit that receives the processed signals from the electronic multiplexing circuit and identifies flaws on the metal part surfaces. The invention also encompasses a method for inspecting at least one segment with a constant geometry on the metal part surfaces using this system, wherein it identifies geometric profile flaws based on the data obtained from the geometric profile sensors and surface flaws based on the data obtained from the eddy current sensors.

20 Claims, 6 Drawing Sheets

(58) Field of Classification Search
USPC .......................................................... 324/238
See application file for complete search history.

(56) References Cited

U.S. PATENT DOCUMENTS

| | | | |
|---|---|---|---|
| 5,140,264 A * | 8/1992 | Metala | G01N 27/904 |
| | | | 324/227 |
| 5,182,513 A * | 1/1993 | Young | G01R 27/00 |
| | | | 324/242 |
| 6,404,189 B2 | 6/2002 | Kwun et al. | |
| 6,924,640 B2 | 8/2005 | Fickert et al. | |
| 9,453,817 B2 | 9/2016 | Nakamura et al. | |
| 2011/0167914 A1* | 7/2011 | Sutherland | F17D 1/00 |
| | | | 73/643 |
| 2014/0200831 A1 | 7/2014 | Smith et al. | |

* cited by examiner

SYSTEM AND METHOD FOR INSPECTING METAL PARTS

CROSS REFERENCE TO RELATED APPLICATIONS

This application is a national stage application under 35 U.S.C. 371 and claims the benefit of PCT Application No. PCT/BR2021/050519 having an international filing date of 25 Nov. 2021, which designated the United States, which PCT application claimed the benefit of Brazilian Patent Application No. BR102020024201 6 filed 26 Nov. 2020, the contents of each of which are incorporated herein by reference in their entireties.

This invention relates to a system and method for inspecting inner or outer metal part surfaces along a regular segment, which may be cylindrical, solid, or hollow, such as tubes, pipes, ducts, mandrels, shafts, various geometric profiles, plates, and tools used in the production of metal parts in general, specifically tubular components, among others.

DESCRIPTION OF THE STATE OF THE ART

The evaluation of the external or internal metal part surfaces, such as tubes, pipes, ducts, mandrels, shafts, profiles, and tools used for the production of these components, is an important step in the fabrication process of such products and in monitoring the integrity and geometric conformity of such tools. Monitoring the condition of these parts is essential to ensure their proper functioning. Different types of non-destructive testing are thus used to evaluate these components.

These evaluations are currently conducted with different devices for different situations. Constituting the state of the art, document AU2015200693 discloses methods and devices for acquiring and processing data from a plurality of different types of sensors for non-destructive testing of metal structures. These methods and devices are used for acquiring data from finished products and not during the fabrication process thereof. A signal from an electromagnetic acoustic transducer (EMAT), an eddy current (EC) signal, a magnetic flux leakage (MFL) signal, and a deflection signal are acquired from each of several localized regions of a metal structure and processed to characterize one or more characteristics of the metal structure, based on at least two of the acquired signals from the EMAT, EC, MFL, and deflection signals from a common localized region, wherein at least a portion of the characteristic is located. An integrated multi-sensor non-destructive testing device may be used to provide EC, EMAT, MFL, and deflection signals for each of the plurality of localized regions of the metal structure. These integrated multi-sensor devices may be configured to provide an in-line inspection tool, such as a smart pig, which is used for pipeline integrity inspections.

Pig-type probes are commonly used, run through the metal component with a specific type of sensor. However, their use is associated with the detection of more severe flaws in cylindrical structures. Furthermore, the above-mentioned document addresses the combination of different types of sensors to obtain results. However, tools like the one described in that document are very costly and highly complex, meaning this solution is not feasible for detecting minor flaws in tubular profiles. The pig disclosed in this prior art works only for evaluating the surfaces of cylindrical components and is not suitable for evaluating the surfaces of plates and hollow components with different geometries and cross-sections.

Document U.S. Pat. No. 4,818,935 discloses a method and device for non-destructive inspection of flaws in metallic materials, including excitation coils centered on a longitudinal cylindrical or columnar axis of the material to be examined, arrayed around the examined material. A relatively low frequency multifrequency alternating current is used to make the excitation coils to generate a rotating magnetic field around the longitudinal axis of the examined material. This multifrequency current is superimposed with a high frequency alternating current, having a selected inspection frequency based on the required sensitivity for detecting surface flaws in the examined material. The composite multifrequency current is applied to the excitation coils, causing the electromagnetic effect induced on the surface of the examined material by the high frequency alternating current to rotate circumferentially around the examined material, together with the rotating magnetic field. A group of detection elements located in proximity to the surface of the examined material detects the alteration of the electromagnetic effect, depending on the presence or absence of a surface flaw in the examined material.

Document U.S. Pat. No. 6,404,189 discloses a method and system for implementing magnetic-strain sensor techniques for the non-destructive evaluation of pipeline structures. The system consists of a magnetic-strain sensor instrument unit, a data storage unit, and a plurality of magnetic-strain sensor probes positioned on an in-line inspection vehicle. The instrumentation unit includes electronics to transmit excitation pulses to a transmitting magnetic-strain sensor probe, as well as electronics to amplify and condition the signals detected by a magnetic-strain sensor probe receiver. The magnetic-strain sensor probes include both plate magnetic-strain sensors and permanent magnets, which provide a direct current polarization magnetic field necessary for the operation of the magnetic-strain sensor; the transmission and reception probes are attached to the in-line inspection vehicle through mechanical arms on opposite sides of the vehicle. The mechanical arms are spring-loaded and equipped with rollers that maintain the probes at approximately constant distances from the inner diameter of the pipe wall. The method involves generating horizontal shear wave pulses at frequencies below 200 kHz. The transmitting magnetic-strain sensor probe generates a wave that spreads in both directions around the circumference of the pipe wall from the point adjacent to the transmitting probe. Both waves are then received by the receiving probe, spaced at 180 degrees from the transmitting probe. Any flaw in the pipe wall within the investigated circumference will be reflected in the received signal.

Document U.S. Pat. No. 6,924,640 discloses an inspection system for detecting flaws in ferro-magnetic pipes used for oil and gas well drilling. The inspection device operates inside the pipe by initially saturating the pipe wall through magnetic flux. Flaws along the pipe wall cause magnetic flux leakage, which is measured by Hall-effect sensors arrayed within the inspection device. The magnitude of the flux leakage is then related to the quantity of material loss. Induced eddy currents in the wall are also measured and combined with the Hall-effect sensor measurements to determine the location and geometric shape of the flaw.

Although different non-destructive pipe inspection devices are already known, there is currently no system at the state of the art that may combine two different types of sensors, one being an eddy current sensor and the other being a magnetic measurement sensor, for processing and combining real-time data uptake and providing analysis and reconstruction of different types of flaws detected in metal parts with different geometries. This includes longitudinal flaws such as cracks, microcracks, bends, bulges, and scratches, as well as geometric profile flaws on pipe surfaces, such as ovalizing, denting, crushing, warping, scaling, and buckling, among others.

PURPOSES OF THE INVENTION

An initial purpose of the invention is to provide a system and method for conducting real-time, in-line inspections of tubular metal parts, their fabrication tools, and metal parts with assorted geometries and cross-sections in general. This is achieved by combining different types of sensors that provide more comprehensive results, identifying different types of flaws, including longitudinal flaws such as cracks, microcracks, and scratches, and geometric profile flaws on metal part surfaces, such as ovalizing, denting, crushing, warping, scaling, and buckling, among others.

Another purpose of the invention is to provide a system and method for obtaining, processing, and analyzing detailed data on the different types of flaws found in an inspected metal part and, based on this data, automatically characterizing and classifying them into different types.

BRIEF DESCRIPTION OF THE INVENTION

The purposes of the invention are achieved by a metal parts surface inspection system, comprising: a frame; a plurality of geometric profile sensors attached to the frame and spaced well apart; a plurality of eddy current sensors attached to the frame and facing the surface of the inspected metal part, whereby there is a relative displacement between the frame and the inspected metal part during the system operations; an electromagnetic signal electronic multiplexing circuit that receives signals obtained by the plurality of geometric profile sensors and eddy current sensors and processes them in real time; and an interpretation and evaluation unit that receives the processed signals from the electronic multiplexing circuit and identifies flaws on the metal part surfaces.

The frame may comprise at least one geometric profile sensor support to which the geometric profile sensors are attached, wherein the geometric profile sensor support has a section compatible with the cross-section of the metal part segment under inspection.

At least some geometric profile sensors are preferably articulatedly attached to the frame and may comprise a rod with a first side articulatedly coupled to one from between the frame or the geometric profile sensor support, and a second side coupled to the contact tip. A magnet is attached to the first side of the rod attached to the frame, and the contact tip of each geometric profile sensor moves over the metal part surface under inspection during the relative displacement between the metal part and the frame.

A bearing can be rotatably coupled to the contact tip of the geometric profile sensor, wherein the bearing rolls along the entire length of the metal part surface segment under inspection.

At least some geometric profile sensors may be one from between a laser point sensor or a laser line sensor, with these laser sensors attached to one from between the frame or the geometric profile sensor support.

The geometric profile sensor may further comprise an encoder coupled to the bearing, wherein the encoder determines the longitudinal location of the measurements taken on the inspected part based on the movement of the bearing on the inspected part surface, sending the corresponding longitudinal location data of the measurements to the electromagnetic signal electronic multiplexing circuit.

Alternatively, at least one spring is coupled to the first side of each rod and one from between the frame or the geometric profile sensor support.

Each eddy current sensor may comprise a shoe and at least two coils coupled to the shoe, wherein each shoe is attached to one from between the frame or the geometric profile sensor support and remains in close proximity to the metal part surface during the relative displacement between the metal part and the frame. Each eddy current sensor measures the interference between the magnetic fields generated by the coils and the magnetic field generated by an induced eddy current in the metal part segment under inspection.

The frame may comprise at least one eddy current sensor support to which the eddy current sensors are attached.

The positioning and quantity of eddy current sensors and geometric profile sensors used are preferably defined based on predetermined resolution and redundancy criteria. Each of the eddy current sensors and geometric profile sensors is mounted independently on an articulated arm.

The eddy current sensors and surface geometric profile sensors are preferably distributed evenly in at least two dimensions in at least two defined rows, with a displacement between adjacent sensors of two sequential rows. The displacement is smaller than the width of a single eddy current sensor.

The multiplexing electromagnetic signal electronic circuit converts the signals obtained by the plurality of geometric profile sensors and eddy current sensors into digital signals and sends them to the interpretation and evaluation unit. The interpretation and evaluation unit analyzes and standardizes the signals, reconstructs the flaws, analyzes flaw parameters, and classifies the identified flaws.

The geometric profile sensors identify flaws in the geometric profile of the inspected metal part's surface, while the eddy current sensors identify flaws such as cracks, microcracks, scratches, and pitting.

The eddy current sensors operate in one from among an absolute configuration, a differential configuration, a pick-up configuration, and a Pulsed Eddy Current (PEC) configuration. The magnetic sensors used in the surface geometric profile sensors are one from among a Hall sensor, a Giant Magneto Resistance (GMR) sensor, and a Superconducting Quantum Interference Device (SQUID) sensor.

The inspection system may include a plurality of rods attached to the frame, with each rod having a geometric profile sensor and an eddy current sensor, whereon the eddy current sensor is located at the contact tip of the geometric profile sensor.

In the inspection system, the frame and sensor supports may be rotatable around the metal part to be inspected. A motor may be attached to the frame to drive its rotational movement. When the inspection system is adapted to inspect the internal surface of the part, it may include a plurality of wheels attached to the external surface of the system to glide over the internal surface of the part to be inspected. The rotational movement of the frame driven by the motor causes the longitudinal movement of the inspection system over the internal surface of the part. Alternatively, the frame may be connected to a traction mechanism that moves the frame inside the metal part to be inspected.

The purposes of the invention are also achieved by a method of inspection for least one segment with a constant geometry on the metal part surfaces, performed by a system as described herein, which comprises:

performing a relative displacement between the system frame and the inspected metal part, and during the movement;

identifying geometric profile flaws on the metal part surface under inspection, based on data obtained from the geometric profile sensors;

identifying surface flaws based on data obtained from the eddy current sensors.

In accordance with one embodiment of the invention, during the relative displacement between the system frame and the inspected metal part:

a.1) the geometric profile sensors obtain measurements relative to the geometry of the metal part surface under inspection.

a.2) eddy currents are induced in the metal part segment under inspection.

a.3) the eddy current sensors measure the interference between the magnetic fields generated by the coils and the magnetic field generated by the induced eddy currents in the inspected segment.

a.4) The geometric profile sensors and the eddy current sensors send these analog measurements to the electromagnetic signal electronic multiplexing circuit.

b) The electromagnetic signal electronic multiplexing circuit converts the analog data captured from step a.4) into digital data and sends it to the interpretation and evaluation unit.

c) The interpretation and evaluation unit identifies flaws on the metal part surface, based on the signals obtained from the geometric profile sensors and the eddy current sensors.

Preferably, in step a.1), the contact tips of at least some geometric profile sensors move over the metal part surface under inspection, and the magnetic sensor detects a magnetic flux generated by the magnet during the movement of the respective geometric profile sensor joint with the frame.

In step a.1), laser sensors may preferably identify variations in the geometry of the metal part surface under inspection and directly send the obtained measurements to the interpretation and evaluation unit.

Preferably, the interpretation and evaluation unit analyzes and standardizes the signals received from the electromagnetic signal electronic multiplexing circuit, reconstructs flaws, analyzes flaw parameters, and classifies identified flaws. Surface flaws include cracks, microcracks, scratches, bends, and bulges, while geometric profile flaws include ovalizing, eccentricity, dents, crushing, warping, build-up of material, and buckling.

The step of performing a relative displacement between the system frame and the inspected metal part may comprise one from among:

Moving the metal part internally to the system frame for inspecting the external metal part surface.

Moving the system frame externally to the metal part for inspecting the external metal part surface.

Moving the metal part externally to the system frame for inspecting the internal metal part surface.

Moving the system frame internally to the metal part for inspecting the internal metal part surface.

BRIEF DESCRIPTION OF THE FIGURES

For better understanding, the characteristics and advantages of this invention will be presented and described, together with the respective Figures, which illustrate some preferred embodiments of the invention.

DETAILED DESCRIPTION OF THE INVENTION

Figure 1:
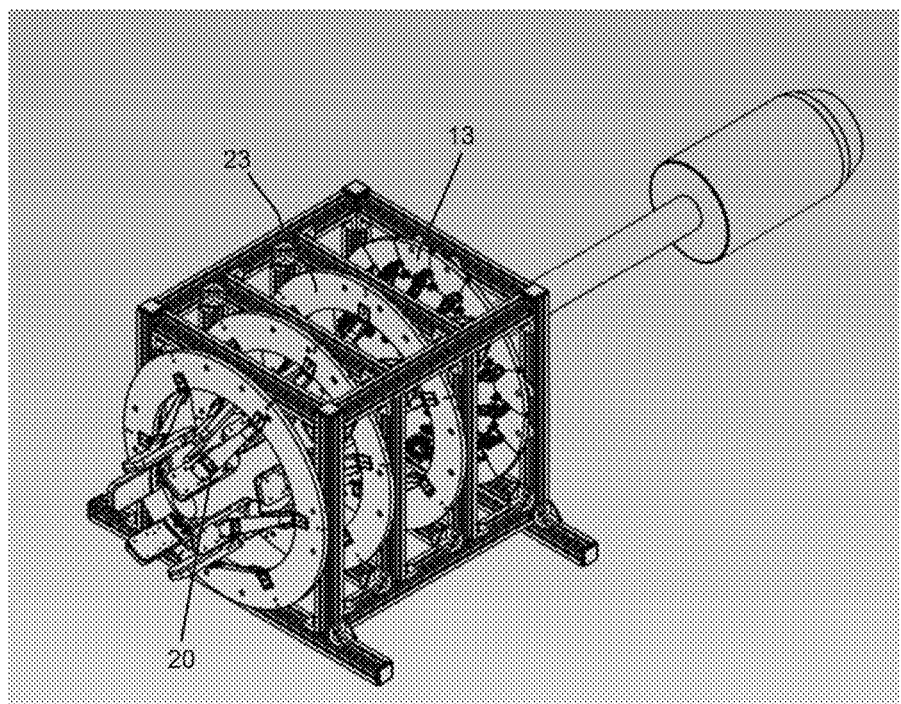
FIG. 1 presents a perspective view of the inspection system according to an embodiment of the invention.
Figure 2:
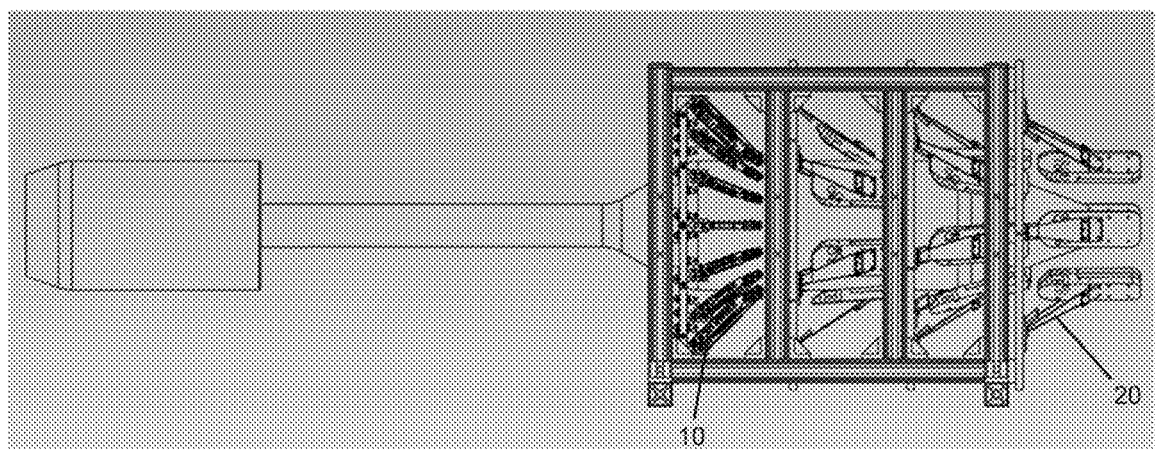
FIG. 2 presents a side view of the inspection system shown in FIG. 1.

FIG. 1 illustrates a preferred embodiment of the metal part inspection system addressed by this invention. The metal parts may be cylindrical, solid, or hollow, such as tubes, pipes, mandrels, shafts, profiles of assorted geometries, sheets, tools for the production of metal parts in general, and specifically tubular parts, among others.

The system comprises a frame 1, to which a plurality of geometric profile sensors 10 are articulatedly attached. The geometric profile sensors 10 are regularly distributed and spaced apart from each other to cover the entire metal part surface to be inspected in radial and axial directions. The geometric profile sensors 10 identify geometric profile flaws such as ovalizing, eccentricity, denting, crushing, warping, scaling, and buckling, among others. During the operation of the system, there is a relative displacement between the frame 1 and the inspected metal part.

Figure 4:
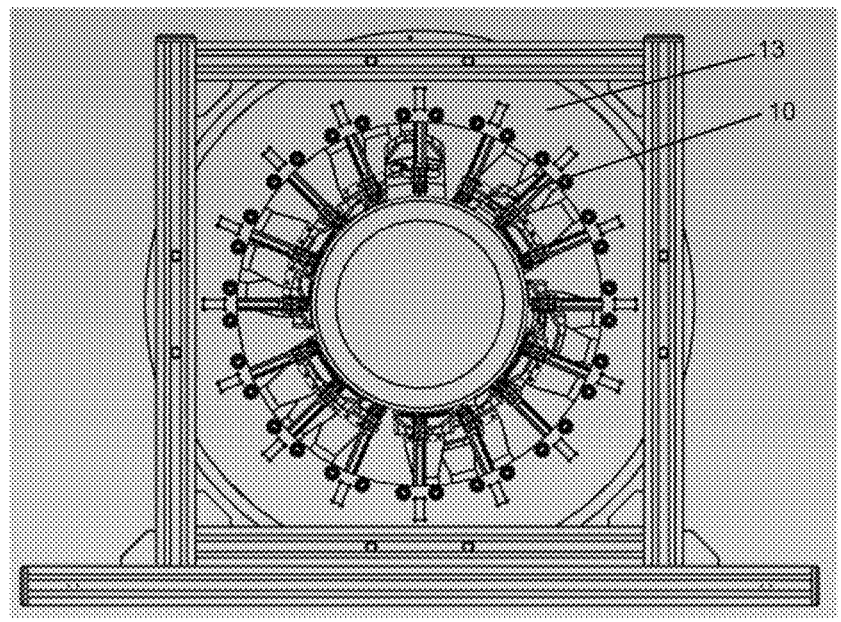
FIG. 4 presents a rear view of the inspection system shown in FIG. 1.

In an embodiment of the invention shown in FIGS. 1 and 4, the frame 1 comprises a geometric profile sensor support 13 attached to it. The geometric profile sensors may be directly attached to the frame 1 or to the support 13. This geometric profile sensor support 13 has a cross-section shape compatible with the cross-section shape of the metal part segment under inspection. For example, when the metal part to be inspected has a circular internal or external cross-section, the geometric profile sensor support 13 may be disk-shaped.

Figure 11:
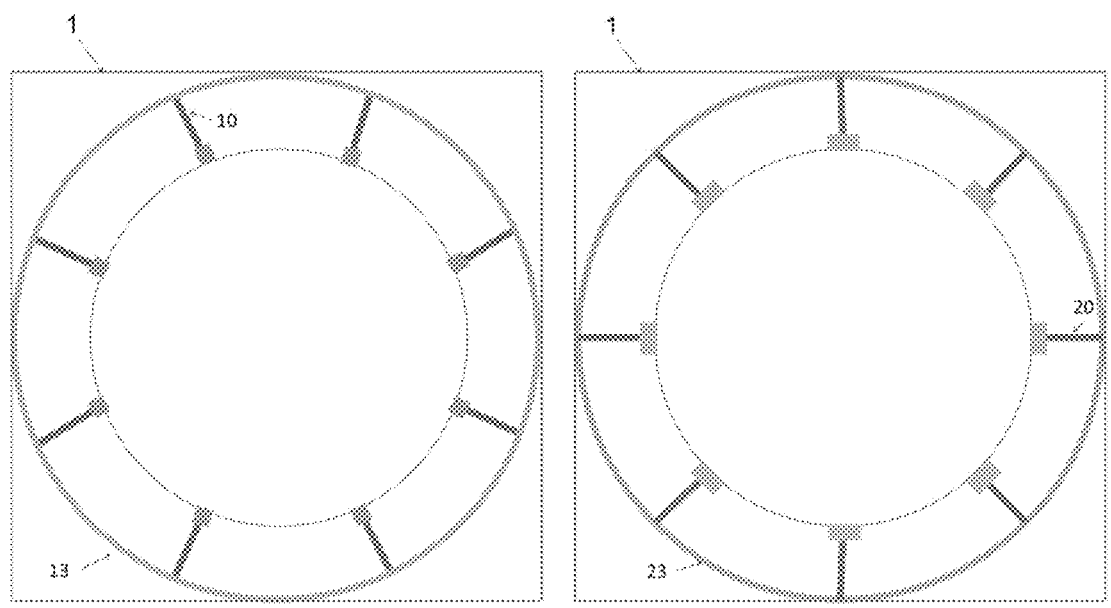
FIG. 11 is a schematic front view of the system according to the invention, performing an inspection of the external surface of a circular cross-section part.

FIG. 11 shows an embodiment of the invention wherein the metal part has a tubular shape with a circular transverse profile, and the system according to the invention inspects the external surface of this part.

On the left side of FIG. 11, the geometric profile sensors 10 are illustrated, circumferentially spaced around the entire circumference of the disk-shaped geometric profile sensor support 13 attached to the frame. In this embodiment of the invention, the metal part may be moved relative to the attached frame so that the disk-shaped support 13 is traversed by the metal parts to be inspected. In the system according to the invention, one or more geometric profile sensor supports 13 may be arrayed in series on the frame, coupled with geometric profile sensors 10, to achieve higher resolution and more reliable measurements.

Figure 3:
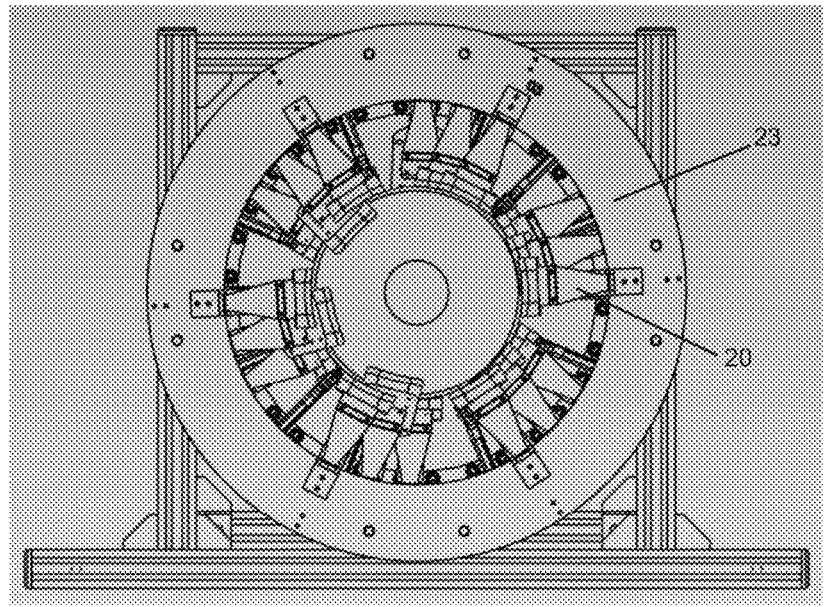
FIG. 3 presents a front view of the inspection system shown in FIG. 1.

The system according to the invention further comprises a plurality of eddy current sensors 20 attached to the frame, also spaced apart from each other. In an embodiment of the invention shown in FIGS. 1 and 3, the frame comprises at least one eddy current sensor support 23 to which the eddy current sensors 20 may be attached.

Thus, when there is a relative displacement between the frame and the inspected metal part, the eddy current sensors 20 also cover the entire metal part surface to be inspected in axial and radial directions. The eddy current sensors 20 obtain data related to the identification of flaws such as cracks, microcracks, bends, scratches, bulges, and pitting in general.

On the right side of FIG. 11, the eddy current sensors 20 are illustrated, circumferentially spaced around the entire circumference of the disk-shaped eddy current sensor support 23 attached to the frame. When the metal part is moved relative to the attached frame, the disk-shaped support 23 is traversed by the metal parts to be inspected. In the system according to the invention, one or more geometric profile sensor supports 23 may be arrayed in series on the frame, coupled with eddy current sensors 20, to achieve higher resolution and reliability of the measurements.

In the embodiment of the invention shown in FIGS. 1 to 4, the system comprises one geometric profile sensor support 13 and three eddy current sensor supports 23 arrayed in series. However, the system may comprise different quantities of geometric profile sensor supports 13 and eddy current sensor supports 23, depending on the desired inspection resolution and the redundancy or reliability of measurements sought through the inspection. The geometric profile sensor supports 13 and eddy current sensor supports 23 are preferably aligned so that the metal part to be inspected may be subjected to measurements from the geometric profile sensors 10 and the eddy current sensors 20 sequentially during the relative displacement between the frame 1 of the system and the metal part for the performance of the inspection.

Figure 7:
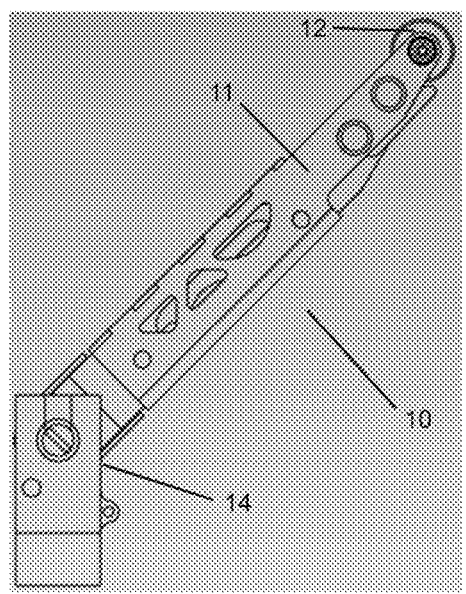
FIG. 7 presents a side view of a geometric profile flaw sensor used in the inspection system according to FIGS. 1 to 4.

FIG. 7 shows the geometric profile sensor 10 in more detail according to an embodiment of the invention. Each geometric profile sensor 10 consists of a rod 11 with a first side articulatedly coupled directly to the frame 1 or to the geometric profile sensor support 13, and a second side equipped with a contact tip 12, which glides on the metal part surface under inspection as the relative displacement occurs between the frame and the metal part.

A magnet 14 and a magnetic measurement sensor able to measure a magnetic field are arrayed in the region of the first side of the rod 11 at the coupling region with the frame 1. Preferably, the magnet 14 is attached to the rod, while the magnetic sensor is attached to the frame 1 or to the geometric profile sensor support 13 where the coupling with the rod occurs.

These geometric profile sensors 10 are responsible for obtaining data related to the geometric profile of the metal part surface and its respective flaws, such as ovalizing, dents, bends, warping, scaling, and buckling, among others.

As also shown in FIG. 7, the rods 11 of the geometric profile sensor are articulated at the coupling region with the frame 1 or with the geometric profile sensor support 13, and at least one spring (not illustrated) or a set of springs is coupled to the first side of the rod 11 and the frame 1, or the first side of the rod 11 and the geometric profile sensor support 13, to help position the contact tip 12 against the surface of the part to be inspected. The contact tip 12 is a free end of the rod 11.

In this embodiment of the invention shown in FIG. 7, the contact tip 12 includes a bearing rotatably coupled to the other side of the rod, with the purpose of reducing friction with the surface of the geometric profile sensor. Consequently, when there is a relative displacement between the metal part and the inspection system, the bearing rolls continuously and with low friction on the surface of the cylindrical part to be inspected, covering the entire segment to be inspected on that surface. Other elements that provide better sliding on the inspected surface, similar to a bearing, may also be used in the contact tip 12.

Figure 8:
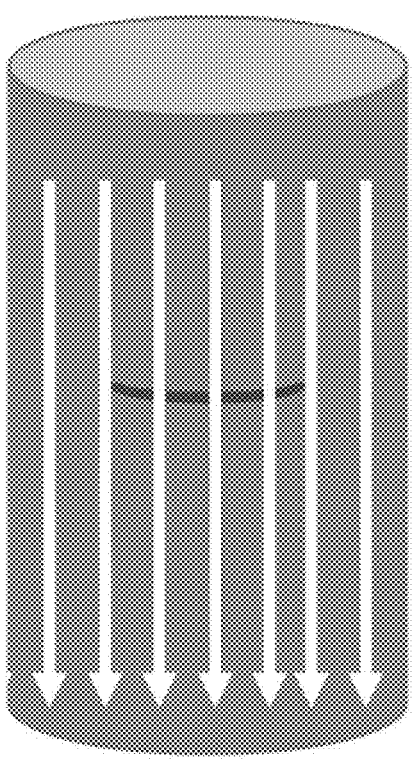
FIG. 8 is an example of a sample metal part being inspected.

The array of a series of regularly spaced geometric profile sensors 10 on the geometric profile sensor support 13 allows these sensors 10 to cross multiple points around the metal part surface under inspection, thus obtaining more information about the entire surface, as shown in FIG. 8. The greater the number of sensors, the larger the portion of the surface evaluated and the higher the resolution, redundancy, and reliability of the inspection findings.

This combination of the rod 11 coupled to the frame 1 with the aid of a spring and the contact tip 12 in the form of a bearing enables easy sliding of the contact tip 12 on the metal part surface, following the variations in the shape of the metal part's surface. When there is a relative displacement between the frame 1 and the metal part, the contact tip 12 of the sensor 10, as it encounters a geometric variation on the part, such as a dent corresponding to a deformation, moves relative to the frame 1 or the geometric profile sensor support 13, causing the rod 11 to rotate at the articulation region with the frame 1 or the support 13, with this movement resulting in a variation of the magnetic flux generated by the magnet and detected by the magnetic sensor. The spring coupled to the rod helps to move it and while remaining in contact with the metal part surface, regardless of the variations in the shape of the part's inspected surface. Magnetic measurement sensors such as Hall sensors, Giant Magneto Resistance (GMR) sensors, and Superconducting Quantum Interference Device (SQUID)) sensors, among others, may be used. Preferably, the magnetic sensor is a Hall sensor powered by a 5-volt direct current. The polarity of the response signal indicates the direction of the magnetic flux variation, in other words, a downward movement of the rod 11, for example, due to a dent on the surface, will generate a negative response signal, while an upward movement, for example, caused by a localized protrusion, will produce a positive response signal. The polarity of the signal may be reversed according to the calibration and positioning of the magnetic sensor.

In an unillustrated embodiment of the invention, laser point or line sensors may be used as geometric profile sensors 10. The laser sensors are directly attached to the frame 1 or the geometric profile sensor support 13 and identify a variation in the geometry of the inspected surface. The system according to the invention may also include a combination of laser point or line sensors and sensors consisting of the rod 11 associated with the magnet and the magnetic sensor as described here, used simultaneously as geometric profile sensors 10.

The geometric profile sensor 10 may also include an encoder (not shown) located near the contact tip 12, which is responsible for determining the specific longitudinal location of the measurements taken relative to the inspected part. This encoder functions similarly to an odometer, converting the corresponding movement of the bearing's linear displacement into an electrical signal. In this way, it is possible to determine how much the bearing has moved relative to the end of the pipe (for example, by calculating how many turns the bearing has made), which allows for identifying the longitudinal position of the detected variation in the pipe's surface shape by the geometric profile sensor 10. The encoder sends the electrical signal to an interpretation and evaluation unit that will be further described later.

The encoder may be placed in only one of the geometric profile sensors 10 used in the system, which serves as a reference for the relative longitudinal displacement of all the other sensors used in the system, including the eddy current sensors 20. Alternatively, the encoder may be placed in multiple geometric profile sensors 10, providing redundancy, with the aim of increasing the precision of identifying the position of the detected shape variations.

Figure 5:
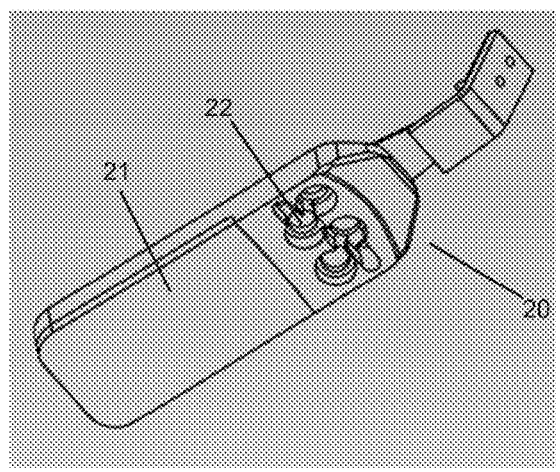
FIG. 5 presents a perspective view of an eddy current sensor used in the inspection system according to FIGS. 1 to 4.
Figure 6:
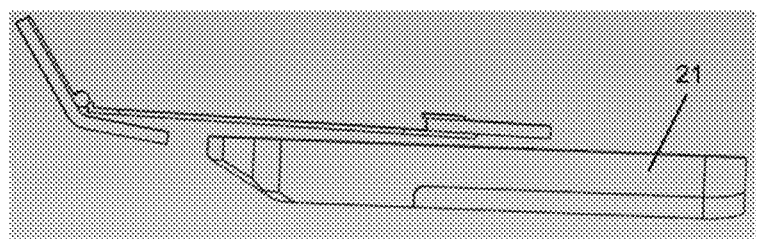
FIG. 6 presents a side view of an eddy current sensor according to FIG. 5.

In another aspect of the invention, the eddy current sensors 20 are best illustrated in FIGS. 5 and 6, according to a preferred embodiment of the invention. The eddy current sensors 20 have an articulated mechanical system that ensures the sensor will always be flat and parallel to the inspected surface. Each sensor 20 includes a shoe 21 with at least two coils 22 attached to the shoe. Preferably, two pairs of coils are used for each sensor 20. Each shoe 21 is attached to the frame 1 or the eddy current sensor support 23 of the frame in a position close to the metal part surface as it passes through the interior of the frame 1.

Furthermore, the eddy current sensor 20 may include supports and springs to prevent direct impact of the metal part on the coils, namely, ensuring that the impact against obstacles occurs away from the coils. The inspected metal part first comes into contact with the eddy current sensor 20 at the level of a rubber base arrayed to cushion the impact. The support materials for the coils may be made of polycarbonate, and the rubber base may be made of polyurethane. Polycarbonate is a high-resistance plastic material, both to impact and temperature. Polyurethane has excellent abrasion resistance and operates at high temperatures. The sensors are arrayed with a displacement between the sensors close to two sequential rows. Preferably, this displacement is smaller than the width of a single eddy current sensor 20.

As the relative displacement occurs between the metal part and the frame 1 of the system, each eddy current sensor 20 detects the interference between the primary and secondary magnetic fields generated by the coils and the magnetic field generated by the eddy current induced in the metal part along the entire length of the metal part corresponding to the position where the sensor is located. The provision of a series of spaced circumferential eddy current sensors 20 in the eddy current sensor support 23 allows these sensors 20 to evaluate various points around the surface to be inspected on the metal part, thus obtaining a greater amount of information about the entire surface, as shown in FIG. 8. The greater the number of sensors, the larger the inspected area of the evaluated surface, resulting in higher resolution and reliability of the inspection result. As may be seen in FIGS. 1 to 4, the eddy current sensors 20 are distributed in circular rows, with a displacement between the "circularly adjacent" eddy current sensors of two sequential rows. Each eddy current sensor is independently mounted on a respective articulated arm. Ideally, the displacement should be smaller than the width of the sensor in order to achieve higher result resolution and maximize the inspected surface, as shown on the results graphs in FIG. 9 and FIG. 10.

As eddy current sensors 20, sensors that operate in an absolute configuration, a differential configuration, a pick-up configuration, a PEC (Pulsed Eddy Current) configuration, among others, may be used. Preferably, the eddy current sensors comprise two ferrite core coils connected in a differential mode, so that the response is a signal difference between the coils that make up the sensor. With the coils 22 of the sensor having the same number of turns but with opposite polarity, the field generated by both coils is the same in magnitude but with opposite direction. Due to this array, when the sensor is located in a homogeneous region, its response is "zero," as one coil cancels out the effect of the other. As it approaches a defective region, the coil 22 that first comes into contact with the flaw will have a different impedance than the coil in the homogeneous region, and consequently, a non-zero signal will be produced. This sensor array is widely used for the detection of pitting, cracks, microcracks, and scratches due to its high sensitivity. It has been found that using the differential configuration, flaw detection is improved with a higher signal-to-noise ratio. Furthermore, the differential mode reduces the influence of lift-off and microstructure variations during inspection. Lift-off is the response signal due to the proximity or distance of the eddy current probe to the inspected material. During inspection, due to external factors such as vibration, the detachment of the eddy current probe generates a response signal that may interfere with flaw identification.

The system according to the invention may be used to inspect internal or external surfaces of hollow metal parts with a closed cross-section, or even to inspect any surface of hollow or open metal parts, or the external surface of solid metal parts, or the top and bottom surfaces of small metal parts (e.g., sheets). To enable these multiple applications of the system according to the invention, it is only necessary to configure the design of the frame 1 and/or the eddy current sensor support 23 and the geometric profile sensor support 13 with a cross-section compatible with the cross-section of the segment to be inspected on the metal part, for example circular, triangular, square, rectangular, hexagonal, etc., in order to allow the geometric profile sensors 10 to glide over the surface to be inspected and for the eddy current sensors 23 to be close enough to the inspected surface to measure the magnetic field generated on the surface by the induced eddy current, and variation in this field.

Figure 12:
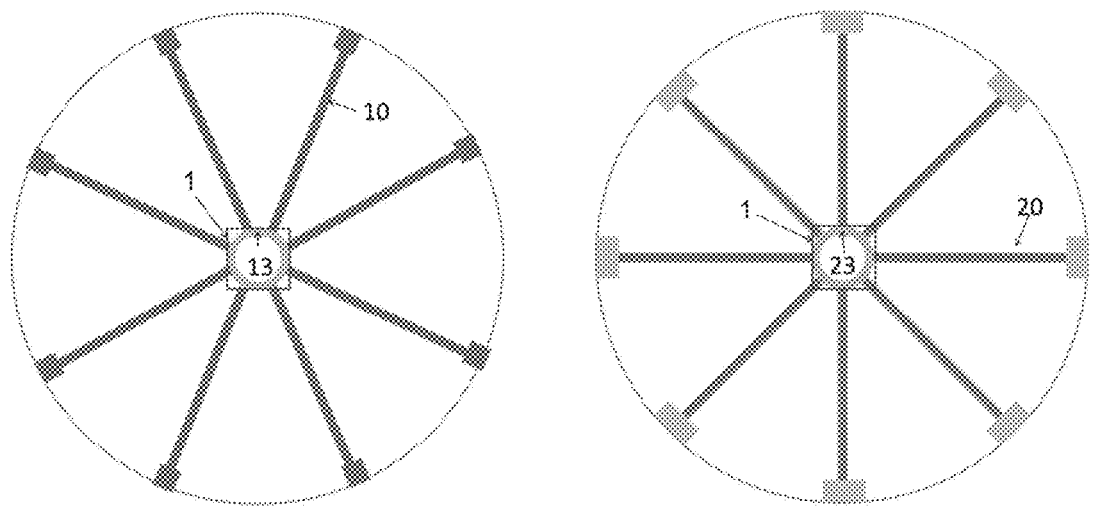
FIG. 12 is a schematic front view of the system according to the invention, performing an inspection of the internal surface of a circular cross-section part.
Figure 13:
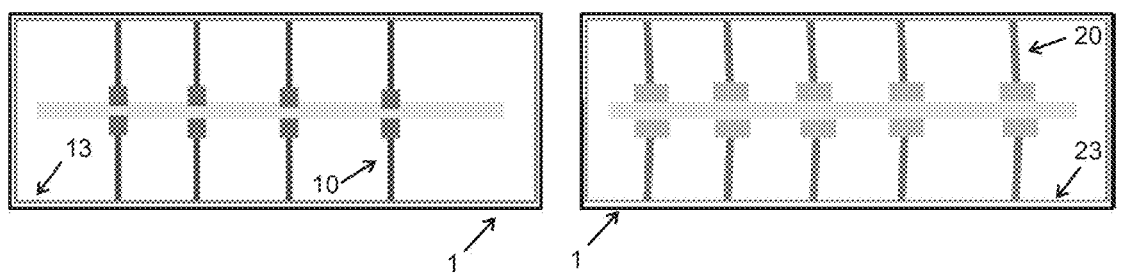
FIG. 13 is a schematic front view of the system according to the invention, performing an inspection of the internal surface of a metal part in the form of a plate.

In the embodiment of the invention shown in FIG. 11, the system is configured to inspect external surfaces of parts with a cylindrical cross-section, so that the frame 1 and the sensors 13 and 23 are positioned outside the metal part. However, in FIG. 12, the system is configured to inspect internal surfaces of parts with a cylindrical cross-section, so that when there is a relative displacement between the frame and the metal part, the frame and the respective sensors pass through the inside of the metal part. In the illustrated embodiment of the invention in FIG. 13, the system is configured to inspect surfaces of sheet metal parts, so that when there is a relative displacement between the frame and the metal part, the frame and the respective sensors pass over and under the metal part. When the metal part has a variable cross-section or geometry, different configurations of the frame and/or the supports may be required to inspect the entire surface of the part.

Furthermore, the system according to the invention may operate with an attached-position frame, so that the metal parts are moved relative to the frame 1, or the metal parts are held in an attached position while the frame 1 and the sensors are moved relative to the part to be inspected.

The system also includes an electromagnetic signal electronic multiplexing circuit, which receives and processes the signals obtained by the geometric profile sensors 10 and the eddy current sensors 20 in real time. The signals captured by the sensors are sent to this multiplexing circuit, which digitizes the signals obtained in real time for subsequent evaluation. An interpretation and evaluation unit receives the digitized and processed signals from the electronic multiplexing circuit and identifies flaws on metal part surfaces using signal processing algorithms dedicated to the reconstruction, evaluation, and automatic classification of flaws. This electronic evaluation unit may be a computer, a data processing center, or any electronic unit able to conduct the evaluation of the obtained data, the reconstruction of images representing the evaluated metal part surface including the flaws and flaws identified by all the sensors, as well as the evaluation and classification of the detected flaws.

The magnetic sensors of the geometric profile sensors, as well as the encoder, are connected to the interpretation and evaluation unit arrayed to associate the measurements of each geometric profile sensor 10 and the encoder. The geometric profile sensors 10 are related to each other by spatial coordinate bases. Each geometric profile sensor has a working direction with a contribution. As a result, the interpretation and evaluation unit is able to calculate the relative spatial position of the contact tip 12 of each geometric profile sensor. Preferably, the interpretation and evaluation unit is configured to generate a two-dimensional or three-dimensional model representing the shape of the external surface of the inspected metal part.

Figure 9:
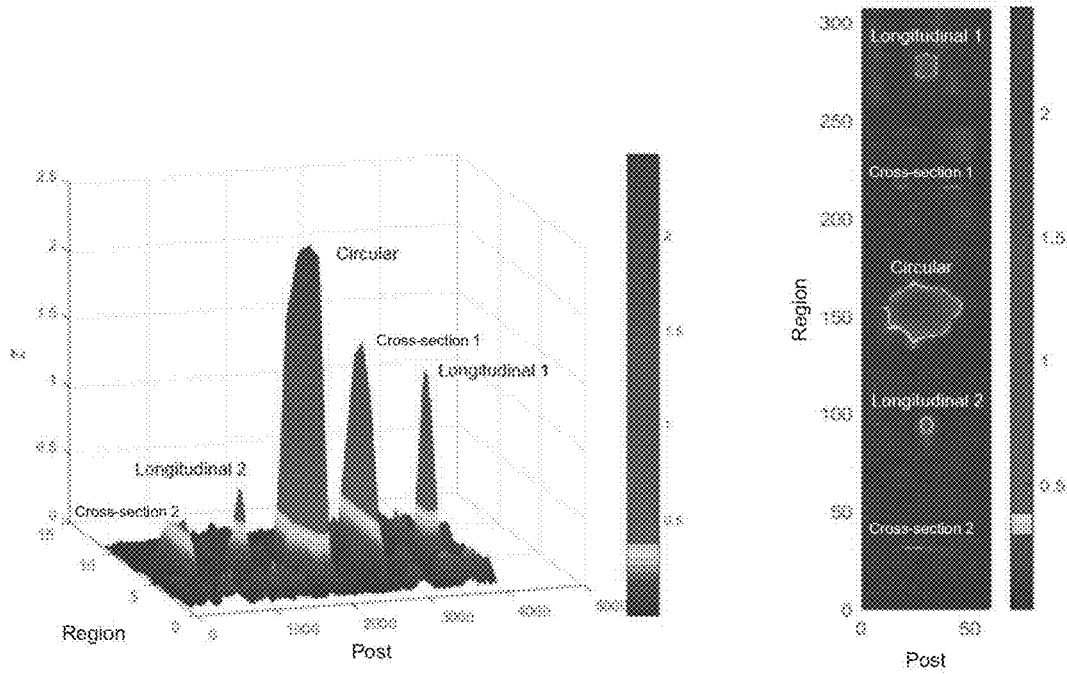
FIG. 9 graphically presents signals indicating flaws on the metal part surface under inspection, identified by the system according to the invention.

Each eddy current sensor 20 is connected to the interpretation and evaluation unit. Each eddy current sensor 20 is associated with a respective registered transverse reference position in the interpretation and evaluation unit. The interpretation and evaluation unit is configured to associate a measured output of each eddy current sensor 20 with its respective transverse reference position and with the output of the longitudinal position generated by the encoder. The interpretation and evaluation unit is configured to provide a graphical result to the user representing the output generated by the eddy current sensor 20 as a function of the longitudinal and transverse positions, with the transverse position obtained from the respective reference positions of the eddy current sensors 20. Such a result is shown in FIG. 9.

In the system according to the invention, the frame 1 may be rotary, rotating in relation to the surface of the part to be inspected, both internally and externally. To provide this rotational movement, a motor is coupled to the frame 1, which is also controlled by the system according to the invention.

A technical advantage of this rotary configuration is that by rotating the frame with the sensors, it is possible to reduce the quantity of eddy current sensor supports 23 and geometric profile sensor supports 13, and consequently, the length of the inspection system is also reduced. This also reduces the number of sensors used and the corresponding costs of the system. Another technical advantage of this rotary configuration is that this rotational movement of the sensors promotes an increase Moreover, when the frame is arrayed internally to the part to be inspected, it may be coupled to its own traction mechanism, similar to a robot, which is responsible for moving the frame inside the metal part. This robot has its own propulsion system with a motor that may be remotely controlled and provides longitudinal displacement of the frame 1 with the sensors inside the metal part. The movement conducted by the robot in the longitudinal direction of the metal part may be combined with the rotary movement of the above-mentioned frame, so that the entire internal metal part surface may be inspected by the sensors of the system according to the invention. In this way, a greater amount of data from the metal part surface is obtained by the system according to the invention, significantly improving the identification of flaws in the part. In an alternative embodiment of the invention using the rotary configuration of the frame, the rotation mechanism of the frame itself is responsible for the longitudinal displacement of the inspection system internally to the part to be inspected. In this embodiment of the invention, the inspection system comprises a rotating head at one of its ends, where the frame with the sensor supports is located. This rotating head is coupled to the motor that provides the rotational movement to this head. Furthermore, small wheels or bearings are attached around the system, on its external surface, in contact with the interior of the part to be inspected. In this way, as the rotating head rotates to one side or the other, the system according to the invention glides forward or backward inside the part to be inspected with the help of the wheels or bearings.

This invention also refers to a method of inspecting a metal part, conducted by the inspection system described herein. This method initially comprises a step of creating a relative displacement between a metal part to be inspected and the frame of the metal part inspection system. During this relative displacement, the contact tips 12 of the geometric profile sensors 10 move by sliding or rolling on the metal part surface under inspection, such that the magnetic sensor detects a magnetic flux generated by the magnet due to the movement of the articulation of the respective geometric profile sensor 10 with the frame 1. During this movement, eddy current is induced in the segment being inspected of the metal part, so that the eddy current sensors 20 measure the interference between the magnetic fields generated by their coils and the magnetic field generated by the induced eddy current in the inspected segment. The geometric profile sensors 10 and the eddy current sensors 20 send these analog measurements to the electromagnetic signal electronic multiplexing circuit.

The electromagnetic signal electronic multiplexing circuit converts the analog data captured by the sensors into digital data and sends it to the interpretation and evaluation unit. This interpretation and evaluation unit identifies flaws on the metal part surface based on the signals obtained from the geometric profile sensors 10 and the eddy current sensors 20.

If laser sensors are used, such as geometric profile sensors, such sensors detect variations in the geometry of the surface of the inspected segment and send them to the interpretation and evaluation unit.

The signals indicating variations in the geometry of the inspected surface may be obtained simultaneously by geometric profile sensors 10 comprising laser sensors and by geometric profile sensors 10 comprising magnetic sensors and magnets.

The interpretation and evaluation unit also performs the steps of analyzing and standardizing the signals received from the electromagnetic signal electronic multiplexing circuit, visually reconstructing flaws through images, analyzing flaw parameters, and classifying the identified flaws.

The identification of flaws on the metal part surface includes identifying geometric profile flaws on the metal part surface under inspection based on the data obtained from the geometric profile sensors 10, such as ovalizing, eccentricity, denting, crushing, warping, scaling, and buckling, among others, and identifying superficial flaws such as cracks, microcracks, scratches, bends, bulges, and pitting, based on the data obtained from the eddy current sensors 20.

The method allows detailed findings to be generated by combining the data captured by both types of sensors. It is thus possible to reconstruct the surface of the inspected metal part with all detected flaws and their dimensions.

Figure 10:
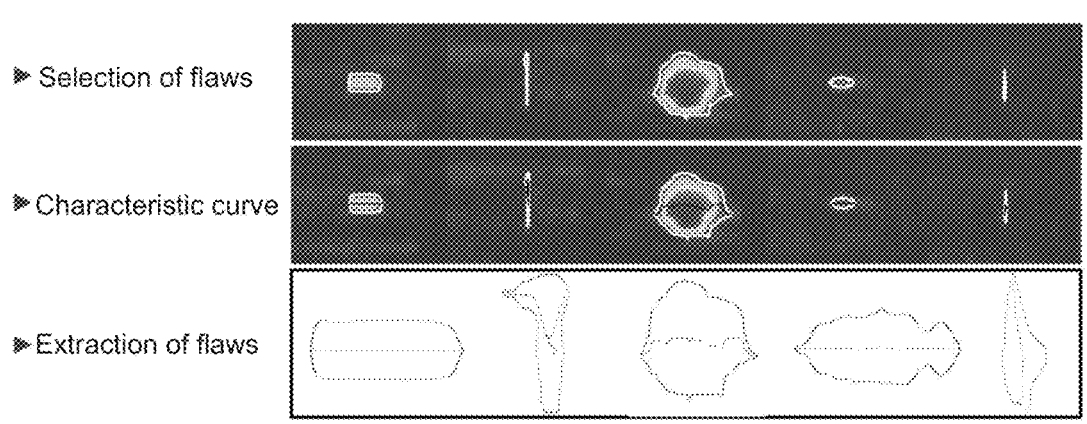
FIG. 10 graphically presents the surface flaws identified by the system according to the invention at different processing steps.

Examples of visual reconstructions of the structure of the surface of the inspected metal part, including the identified flaws based on an analysis of the obtained data, are shown in FIGS. 9 and 10. In the example shown in these figures, the external surface of a tubular-shaped part called "Sample 0" is evaluated. This part exhibits machined flaws with dimensions identified in the following table below.

| Sample 0 | |
| --- | --- |
| Flaw Type | Flaw Characteristics |
| Longitudinal 1 | Length = 30.0 mm |
| | Width = 5.0 mm |
| | Depth = 2.0 mm |
| Longitudinal 2 | Length = 28.0 mm |
| | Width = 2.0 mm |
| | Depth = 1.5 mm |
| Cross-section 1 | Length = 30.0 mm |
| | Width = 5.0 mm |
| | Depth = 2.0 mm |
| Cross-section 2 | Length = 28.0 mm |
| | Width = 2.0 mm |
| | Depth = 1.5 mm |
| Circular | Length = 31.0 mm |
| | Width = 36.0 mm |
| | Depth = 2.0 mm |

According to the table above, the flaw types were classified based on their shape and in relation to the axial direction of the tubular-shaped part.]

The graph on the left in FIG. 9 shows the representative signals obtained for the 5 flaws from the table above, reconstructed after processing in the interpretation and evaluation unit, where the z-axis represents the response amplitude of the signals, and the xy-plane (x-position region) represents the inspected area of the part. The right graph in FIG. 9 illustrates the top-down view of the left graph, corresponding to the result of the part inspection, showing the five detected flaws. The right xy-plane graph represents the inspected surface of the part.

FIG. 10 presents a graph with the results of different processing steps of data on the five flaws shown in FIG. 9, during the evaluation, reconstruction, and classification of these flaws, according to an embodiment of the invention. The first line of FIG. 10 shows the selection of the identified flaws in FIG. 9, by tracing a white contour line along the edges of these flaws. After the selection of the flaws and tracing the contour line, a characteristic curve is defined and represented as a black line above the flaws in the second line of FIG. 10. Next, only the contour lines and the characteristic curves are used to represent the flaws, as shown in the third line of FIG. 10. The complete representation of the flaws shown in the graphs of FIG. 9 is very data-heavy, as it contains a large amount of data and information. However, a significant amount of this data is not needed for flaw identification. The system and the method according to the invention can extract the flaws based solely on the information in the contour lines and characteristic curves of each flaw. The extracted flaws based thereon are shown in the third line of FIG. 10. The following characteristics of these flaws are extracted from the contour lines and the characteristic curves: length, width, depth, perimeter, and area.

The system and the method addressed by this invention thus allow detailed real-time inspections of metal parts in general, of various sizes and diameters, due to the availability and positioning of the sensors on the frame and/or the supports, covering the entire surface to be inspected of the metal part as the relative displacement between the frame and the metal part occurs. The rods 11 associated with the springs also enable the adjustment of the system to metal parts of different diameters. The ability to conform the frame and/or the supports to different geometries and sections of the parts to be inspected endows the system and the method addressed by the invention with great flexibility.

The system and the method according to the invention, by associating the results of the two different types of complementary sensors, allow the identification of flaws on metal part surfaces of different types, both arising from flaws in the shape and geometry of the metal part's surface, as well as cracks, fissures, and pitting, at any position on the metal part surface.

The use of eddy current sensors 20 that can detect very small flaws allows greater precision for the investigation of metal part surfaces.

What is claimed is:

1. An inspection system for internal and/or external surfaces of metal parts, comprising:
a frame;
a plurality of geometric profile sensors attached to the frame at spaced intervals through at least one geometric profile sensor support;
a plurality of eddy current sensors attached to the frame at spaced intervals through at least one eddy current sensor support and facing an internal and/or external surface of a metal part to be inspected, wherein during operation of the inspection system, there is a relative displacement between the frame and the inspected metal part;
an electronic circuit for multiplexing electromagnetic signals that receives and processes in real time signals obtained by the plurality of geometric profile sensors and the plurality of eddy current sensors; and
an interpretation and evaluation unit that receives processed signals from the electronic circuit and identifies flaws on the internal and/or external surface of the inspected metal part,
wherein the at least one geometric profile sensor support has a section compatible with a cross section of a segment of the inspected metal part, and
wherein at least some geometric profile sensors from among the plurality of geometric profile sensors are articulatedly attached to the frame and comprise:
a rod with a first side articulatedly coupled to either the frame or the at least one geometric profile sensor support, and a second side coupled to a contact tip; and
a magnet attached to the first side of the rod coupled to the frame, wherein the contact tip of each geometric profile sensor moves over the internal and/or external surface of the inspected metal part during the relative displacement between the inspected metal part and the frame.

2. The inspection system according to claim 1, wherein a bearing is rotatably coupled to the contact tip of a geometric profile sensor of the at least some geometric profile sensors, and the bearing rolls along an entire length of the segment of the internal and/or external surface of the inspected metal part.

3. The inspection system according to claim 1, wherein at least some geometric profile sensors from among the plurality of geometric profile sensors are either a point laser sensor or a line laser sensor, and these laser sensors are coupled to either the frame or the at least one geometric profile sensor support,
- wherein at least one spring is coupled to the first side of each rod and to one of the frame and the at least one geometric profile sensor support, and
- wherein magnetic sensors of the geometric profile sensors are one of Hall sensors, Giant Magneto Resistance (GMR) sensors, or Superconducting Quantum Interference Device (SQUID) sensors.

4. The inspection system according to claim 2, wherein each one of the plurality of the plurality of geometric profile sensors further comprises an encoder coupled to the bearing, wherein the encoder determines a longitudinal location of measurements taken on the inspected metal part, based on movement of the bearing over the internal and/or external surface of the inspected metal part, and sends corresponding longitudinal location data of the measurements to the electronic circuit.

5. The inspection system according to claim 1, wherein:
- each of the plurality of eddy current sensors comprises a shoe and at least two coils coupled to the shoe, wherein each shoe is attached to one of the frame and the at least one geometric profile sensor support, positioned close to the internal and/or external surface of the at least one inspected metal part during the relative displacement between the inspected metal part and the frame; and
- each of the plurality of eddy current sensors measures interference between magnetic fields generated by the at least two coils and a magnetic field generated by an induced eddy current in the segment of the inspected metal part,
- wherein the plurality of eddy current sensors operate in one of the following configurations: absolute configuration, differential configuration, pickup configuration, and Pulsed Eddy Current (PEC) configuration.

6. The inspection system according to claim 1, wherein a positioning and quantity of the plurality of eddy current sensors and the plurality of geometric profile sensors used are defined based on predetermined resolution and redundancy, and each one of the plurality of the eddy current sensors and each one of the plurality of geometric profile sensors is mounted independently on an articulated arm.

7. The inspection system according to claim 6, wherein the plurality of eddy current sensors and the plurality of geometric profile sensors are regularly distributed in at least two dimensions, defining at least two rows, and there is a displacement between adjacent sensors of two sequential rows, and wherein the displacement between adjacent sensors of two sequential rows is smaller than a width of a single eddy current sensor.

8. The inspection system according to claim 1, wherein:
- the electronic circuit converts signals obtained from the plurality of geometric profile sensors and the plurality of eddy current sensors into digital signals and sends them to the interpretation and evaluation unit; and
- the interpretation and evaluation unit analyzes and standardizes the digital signals, reconstructs the identified flaws, analyzes parameters of the identified flaws, and classifies the identified flaws.

9. The inspection system according to claim 1, wherein:
- the plurality of geometric profile sensors identifies flaws in a geometric profile of the segment of the inspected metal part; and
- the plurality of eddy current sensors identifies flaws such as cracks, microcracks, scratches, and small-sized mass loss flaws.

10. The inspection system according to claim 1, further comprising a plurality of rods coupled to the frame, wherein each rod is coupled to a geometric profile sensor and an eddy current sensor, and wherein the eddy current sensor is located at the contact tip of the geometric profile sensor.

11. The inspection system according to claim 1, wherein the frame is rotatable together with the at least one geometric profile sensor support and/or the at least one eddy current sensor support around the inspected metal part.

12. The inspection system according to claim 11, wherein when the inspection system is adapted for inspecting the internal surface of the inspected metal part, the inspection system further comprises:
- a plurality of wheels coupled to an external surface of the inspection system for sliding on the internal surface of the inspected metal part, wherein rotational movement of the frame is driven by a motor and causes longitudinal movement of the inspection system on the internal surface of the inspected metal part.

13. The inspection system according to claim 1, wherein the frame is coupled to a traction mechanism that moves the frame inside the inspected metal part.

14. A method of inspecting internal and/or external surfaces of metal parts performed by an inspection system, wherein the method comprises:
- performing a relative displacement between a frame of the inspection system and a metal part to be inspected, wherein the inspection system further comprises:
  - a plurality of geometric profile sensors attached to the frame at spaced intervals through at least one geometric profile sensor support;
  - a plurality of eddy current sensors attached to the frame at spaced intervals through at least one eddy current sensor support and facing an internal and/or external surface of the metal part to be inspected, wherein during operation of the inspection system, there is a relative displacement between the frame and the inspected metal part;
  - an electronic circuit for multiplexing electromagnetic signals that receives and processes in real time signals obtained by the plurality of geometric profile sensors and the plurality of eddy current sensors; and
  - an interpretation and evaluation unit that receives processed signals from the electronic circuit and identifies flaws on the internal and/or external surface of the inspected metal part; and
- during the relative displacement:
  - identifying geometric profile flaws on the internal and/or external surface of the inspected metal part based on data obtained by the plurality of geometric profile sensors; and
  - identifying surface flaws based on data obtained by the plurality of eddy current sensors,
  - wherein during the relative displacement between the frame of the inspection system and the inspected metal part:
    - a.1) the plurality of geometric profile sensors obtain measurements related to the geometry of a segment of the inspected metal part;

a.2) an eddy current is induced in the segment of the inspected metal part;

a.3) the plurality of eddy current sensors measure interference between magnetic fields generated by coils of the eddy current sensors and the magnetic field generated by the induced eddy current in the segment of the inspected metal part;

a.4) the plurality of geometric profile sensors and the plurality of eddy current sensors send the respective analog measurements to the electronic circuit;

b) the electronic circuit converts analog data captured in a.4) into digital data and sends the digital data to the interpretation and evaluation unit; and c) the interpretation and evaluation unit identifies flaws on the internal and/or external surface of the inspected metal part based on the signals obtained by the plurality of geometric profile sensors and the plurality of eddy current sensors.

15. The method of claim 14, wherein:

in a.1), contact tips of at least some of the plurality of geometric profile sensors move over the internal and/or external surface of the inspected metal part, wherein a magnetic sensor detects a magnetic flux generated by a magnet of geometric profile sensor during articulation movement of the respective geometric profile sensor with the frame during this displacement.

16. The method of claim 14, wherein:

in a.1), laser sensors of the geometric profile sensors identify a variation in the geometry of the segment of the inspected metal part and directly send the obtained measurements to the interpretation and evaluation unit.

17. The method of claim 14, wherein the interpretation and evaluation unit analyzes and standardizes the processed signals received from the electronic circuit, reconstructs the identified flaws, analyzes parameters of the identified flaws, and classifies the identified flaws.

18. The method of claim 14, wherein the surface flaws comprise cracks, microcracks, scratches, bends, and bulges, and the geometric profile flaws include ovalizing, eccentricity, denting, crushing, warping, scaling, and buckling.

19. The method of claim 14, wherein the step of performing a relative displacement between the frame of the inspection system and the inspected metal part comprises one of:

displacing the inspected metal part internally to the frame of the inspection system for inspecting the external surface of the inspected metal part;

displacing the frame of the inspection system externally to the inspected metal part for inspecting the external surface of the inspected metal part;

displacing the inspected metal part externally to the frame of the inspection system for inspecting the internal surface of the inspected metal part; and moving the frame of the inspection system internally to the inspected metal part for inspecting the internal surface of the inspected metal part.

20. An inspection system for internal and/or external surfaces of metal parts, comprising:

a frame;

a plurality of geometric profile sensors attached to the frame at spaced intervals through at least one geometric profile sensor support;

a plurality of eddy current sensors attached to the frame at spaced intervals through at least one eddy current sensor support and facing the internal and/or external surface of a metal part to be inspected of the metal parts, wherein during operation of the inspection system, there is a relative displacement between the frame and the inspected metal part;

an electronic circuit for multiplexing electromagnetic signals that receives and processes in real time signals obtained by the plurality of geometric profile sensors and the plurality of eddy current sensors; and an interpretation and evaluation unit that receives processed signals from the electronic circuit and identifies flaws on the internal and/or external surface of the inspected metal part, wherein a positioning and quantity of the plurality of eddy current sensors and the plurality of geometric profile sensors used are defined based on predetermined resolution and redundancy, and each one of the plurality of the eddy current sensors and each one of the plurality of geometric profile sensors is mounted independently on an articulated arm, and wherein the plurality of eddy current sensors and the plurality of geometric profile sensors are regularly distributed in at least two dimensions, defining at least two rows, and there is a displacement between adjacent sensors of two sequential rows, and wherein the displacement between adjacent sensors of two sequential rows is smaller than a width of a single eddy current sensor.

* * * * *